INVENTOR
MARVIN WILLS
BY
ATTORNEY

INVENTOR
MARVIN WILLS
BY
Richard W Hansen
ATTORNEY

United States Patent Office  3,606,562
Patented Sept. 20, 1971

3,606,562
OFFSET BORING HEAD
Marvin Wills, 2630 E. Willamette Ave.,
Colorado Springs, Colo. 80909
Filed May 19, 1969, Ser. No. 825,629
Int. Cl. B23b 29/034
U.S. Cl. 408—181                           4 Claims

ABSTRACT OF THE DISCLOSURE

An adjustable precision boring head for machine tools having coarse and fine adjustment means comprising four slidably interconnected elements in stacked relation and wherein the coarse adjustment for lateral movement of the cutting tool comprises screw means for moving the first and second of said elements with respect to each other along a single axis, and where the fine adjustment comprises further means interconnecting the second and third elements wherein they are movable with respect to each other at an angle of ninety degrees to the direction of longitudinal movement between the first and second elements, and further having means interconnecting the third and fourth elements in such a manner that they are movable with respect to each other along two mutually perpendicular axes, where, because of the operation of guides, the second and fourth elements are restricted in their relative movement to a direction which is parallel to the direction of relative movement between the first and second of the stacked elements.

---

The present invention relates generally to machine tools and more specifically to a boring head for use in jig bores, boring mills and turret lathes.

The prior art has seen the use of a number of adjustable devices for holding single point boring tools. These holders are typically constructed to permit lateral movement of the boring tool to provide sizing adjustment of the cut to be made by the machine. Several problems are inherent in the design of such an adjustable tool holder however, most of which have not been overcome by the teachings of the prior art. First, the loads which must be tolerated in such a device, especially with large offsets, require a very rigid structure which may not be compatible with the fine and accurate adjustments which are desired. Second, the adjusting mechanisms of the prior art are inherently void of the precision required by today's high tolerance requirements.

Therefore, it is the object of the present invention to provide an offset boring head which meets the structural requirements of heavy cuts and hard workpiece materials while at the same time giving an ease of accurate adjustment heretofore unknown.

A second object of the invention is to provide a novel dual adjustment on the boring head which can accurately position the boring tool to tolerance in the millionths of an inch range.

Other and further objects, features and advantages of the offset boring head of the present invention will become apparent upon a reading of the following detailed description of the preferred form of the invention, taken in conjunction with the accompanying drawings in which.

Figure 1:
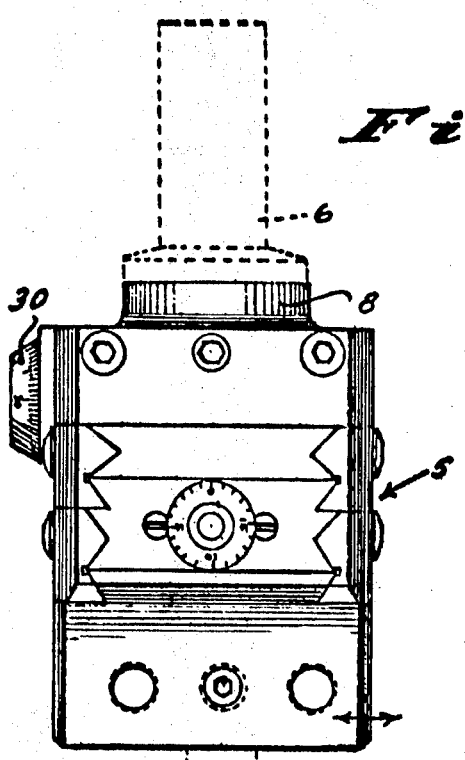
FIG. 1 is a side elevational view of the boring head of the present invention with the spindle and boring tool shown in dashed lines.
Figure 2:
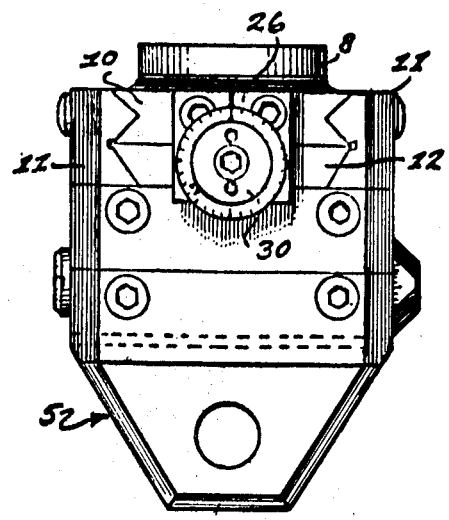
FIG. 2 is a front elevational view of the boring head.
Figure 4:
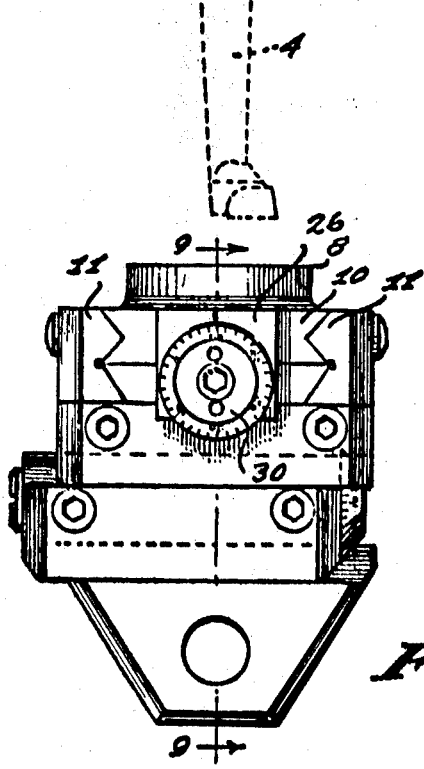
FIG. 4 is a front elevational view of the boring head showing the second slide member displaced for adjustment of the boring bar.
Figure 3:
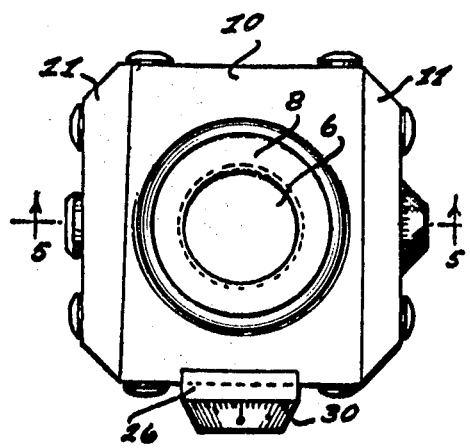
FIG. 3 is a top plan view of the boring head.
Figure 5:
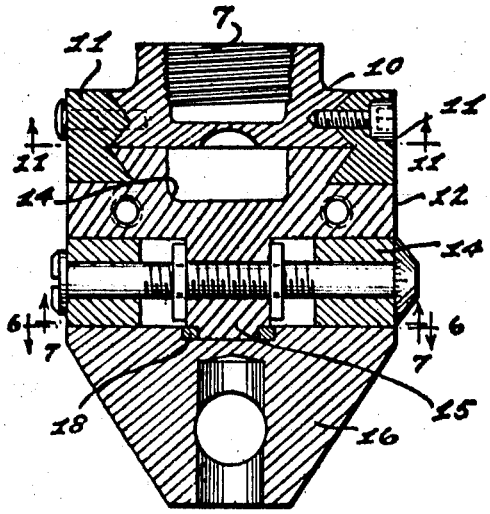
FIG. 5 is a cross sectional view taken along lines 5—5 in FIG. 3.

Referring first to FIG. 1, a spindle 6 is shown in dashed lines as the convenient means of attaching the boring head 5 to the rotating chuck of the jig bore (not shown), or other machine being employed to rotate the cutting tool 4. The spindle 6 extends downwardly through a boss 8, integral with the base member 10, where it is secured to the base 10 by a suitable threaded connection 7 (FIG. 5). As may be seen in FIGS. 2 and 5, the opposing sides of the base 10 are grooved to accept the mating edges of a pair of upper retainer gibs 11. The lower portion of the gibs 11 is beveled so as to form a dovetail with the correspondingly beveled upper side portion of a first slide member 12.

Figure 9:
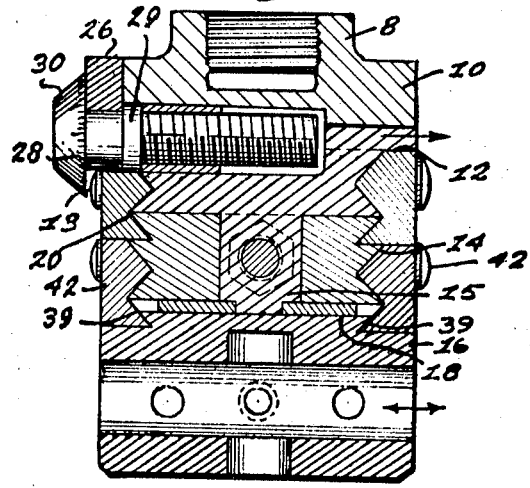
FIG. 9 is a cross sectional view taken along lines 9—9 of FIG. 4.
Figure 10:
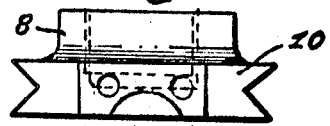
FIG. 10 is a front elevational view of the base member.
Figure 11:
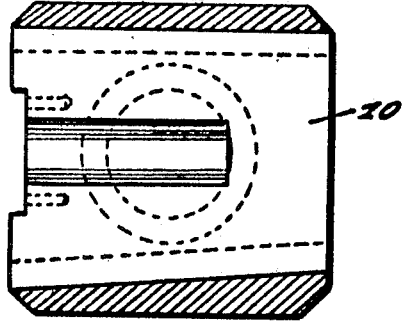
FIG. 11 is a cross sectional view taken along lines 11—11 in FIG. 5.

The gibs 11 serve to securely interconnect the base 10 and first slider 12 in sliding relation which is made operative through the means of a rotatable threaded screw 13. The screw 13 lies within a recess 14 in the slider 12 and is threadingly engaged in a tubular bushing 20 which is rigidly secured to the slider 12. Rotation of the screw 13 is effective to cause relative movement between the slider 12 and the base 10 through the interaction of a depending bushing 26, secured to the base 10, and the abutting face of an annular flange 29 integral with the screw 13. A dial indicator 30 is attached to the one end of the screw 13 for rotation therewith and abuts on the other side of the depending bushing 26. It will thus be apparent that as the screw 13 is turned, relative movement is created between the base 10 and slider 12 which the tool 4 in a lateral direction coaxial with the longitudinal axis of the screw 13, as depicted in FIG. 9 with the reference M. Such movement is designed to provide a course adjustment for the lateral position of the boring tool 4. Finer adjustment is provided with a second adjusting screw 32 which provides movement of a second slide 14 relative to the slider 12 and in a direction at right angles thereto.

The second slide 14 is disposed below and in adjacent relation to the slider 12 and is provided with a central opening through which extends an integral projecting stud 15 of the slider 12. The bottom of the stud 15 is circularly formed to receive and hold a rectangular guide plate 18, as best seen in FIG. 9. A second adjusting screw 32 is threaded through the depending stud 15 of the slider 12 and by means of an end cap screw 21 and a calibrated end cap 22, both secured to the screw 32 and rotatable therewith. Rotation of the screw 32 causes movement of the slide 14 with respect to the slider 12 and in a direction normal to the axis of the first screw 13. The slider 12 and slide 14 are retained in sliding relationship by means of beveled gibs 23 which, like gibs 11, create a dovetail relationship between the beveled edges of the two sliding members 12 and 14.

Figure 6:
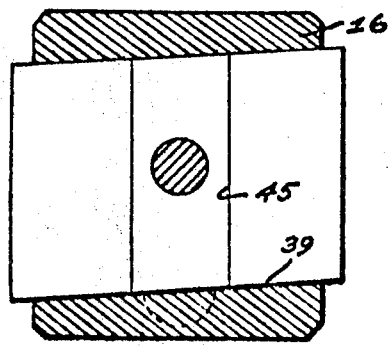
FIG. 6 is a cross sectional view taken along lines 6—6 in FIG. 5.
Figure 7:
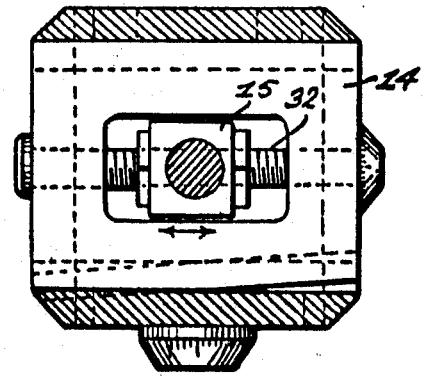
FIG. 7 is a cross sectional view taken along line 7—7 in FIG. 5.
Figure 8:
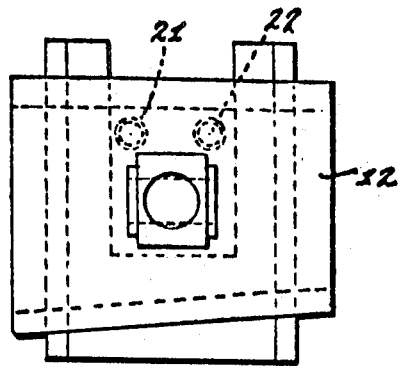
FIG. 8 is a bottom plan view of the first adjustment slider member.

The elements of the boring tool include as a last element the tool bar 16 which is provided with well known means for securing the shank of a boring tool therein. The tool bar 16 is shown in a top plan view in FIG. 6 which illustrates the inclined nature of the dovetail edge 39 of the upper surface of the tool bar 16. The incline of the dovetail's edges is exaggerated in FIG. 6 for purposes of illustration, however, in actual practice, the incline would be less for greater precision of adjustment.

Cooperating with the dovetail edges 39 of the tool bar 16 are a pair of inclined groove lower gibs 42 which serve to interconnect the slide 14 and the tool bar 16 in an intersliding relation. In addition to interconnecting the two last mentioned members, the gibs serve the important function of compelling movement of the tool bar 16 along the inclined plane of the dovetail edge 39 as the tool bar 16 and slide 14 are moved relative to one another by rotation of the second screw 32.

As will be apparent, movement of the tool bar 16 along the inclined plane 39 results in tool bar movement composed of two components, to-wit: a lengthwise component along the length of the inclined edge and a normal component having a direction parallel to the two sides of a slot 45 in the upper surface of the tool bar dovetail. Because the rectangular guide plate 18 is disposed within the slot 45 of the tool bar 16 the movement of the latter is confined to a direction parallel to the side of the guide 18 and hence in a direction perpendicular to the second screw 32, and hence in a direction parallel to the axis of the first screw 13. It is obvious that a rather large relative movement between the tool bar 16 and the slide 14 will cause relatively small movement of the tool bar 16 with respect to the rectangular guide 18, thereby obtaining a vernier adjustment of the movement of the tool bar 16 by appropriate rotation of the second and vernier adjusting screw 32.

Having thus described the several useful and novel features of the offset boring head of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. An offset boring head having in combination:
   a tool holding bar having a dovetail slide and having a parallel sided slot in the surface thereof, the sides of said slot being inclined to the side of said dovetail,
   a second member slidingly attached to the tool bar and movable with respect thereto in a direction normal to the sides of said slot,
   guide means interconnecting the tool bar and the second member for compelling relative movement therebetween along the dovetail slide of the tool bar;
   a third member slidingly attached to the said second member and movable in respect thereto and said third member having a guide secured thereto, said guide being disposed in the said slot in the tool bar;
   a base member slidingly attached to the said third member and movable in respect thereto in a direction parallel to the sides of the said slot;
   means for attaching the said base to source of rotative power.

2. A boring head, comprising:
   a plurality of four slidably interconnected elements disposed in stacked relation, the first and uppermost of said elements comprising a base reference and having,
   means secured thereto for attaching the boring head to a source of rotative power; and
   means interconnecting said first and second elements wherein said first and second elements are movable with respect to each other along a single axis; and
   means interconnecting said second and third elements wherein said second and third elements are movable with respect to each other at an angle of ninety degrees to the directions of longitudinal movement between said first and second elements; and
   means interconnecting said third and fourth elements wherein said third and fourth elements are movable with respect to each other along two mutually perpendicular axes;
   and including guide means operatively interconnecting said second and fourth elements wherein the relative movement between the second and fourth elements is restricted to being parallel to the directions of relative movement between the first and second elements.

3. The apparatus of claim 2 wherein the interconnecting means between said third and fourth elements comprises a dovetail slide integral with the fourth element whose sides are angularly disposed to the direction of movement of the said third element.

4. The combination of claim 3 wherein said guide means includes:
   a guide plate attached to the said second element;
   a slot in said fourth element for receiving the said guide plate, said slot being parallel to the vertical component of the said inclined dovetail slide.

References Cited
UNITED STATES PATENTS

| | | | |
|---|---|---|---|
| 2,874,597 | 2/1959 | Bach | 77—58 |
| 3,014,391 | 12/1961 | Fuhrman | 77—58 |
| 3,144,792 | 8/1964 | Marchis | 77—58 |

GERALD A. DOST, Primary Examiner